(12) United States Patent
Andrews

(10) Patent No.: US 7,261,942 B2
(45) Date of Patent: Aug. 28, 2007

(54) PHOTOCATALYTICALLY-ACTIVE, SELF-CLEANING AQUEOUS COATING COMPOSITIONS AND METHODS

(75) Inventor: John Andrews, Madison, CT (US)

(73) Assignee: Prizmalite Industries Inc., New York, NY (US)

( * ) Notice: Subject to any disclaimer, the term of this patent is extended or adjusted under 35 U.S.C. 154(b) by 0 days.

(21) Appl. No.: 11/071,505

(22) Filed: Mar. 3, 2005

(65) Prior Publication Data

US 2005/0147744 A1 Jul. 7, 2005

Related U.S. Application Data

(62) Division of application No. 10/334,229, filed on Dec. 31, 2002, now Pat. No. 6,884,752.

(51) Int. Cl.
| | |
|---|---|
| B32B 17/00 | (2006.01) |
| B32B 5/10 | (2006.01) |
| C03C 11/02 | (2006.01) |
| B01J 23/00 | (2006.01) |
| C01B 15/00 | (2006.01) |

(52) U.S. Cl. .............. 428/411; 428/632; 428/660; 428/688; 428/689; 428/403; 428/621; 502/349; 502/350; 423/582; 423/598; 423/608; 106/287.13; 106/287.19; 106/436; 106/447; 524/413; 524/430

(58) Field of Classification Search .............. 502/349, 502/350; 423/582, 598, 608; 106/287.13, 106/287.19, 436, 447, 413, 430; 524/413, 524/430; 428/403, 621, 632, 660, 688, 689, 428/532

See application file for complete search history.

(56) References Cited

U.S. PATENT DOCUMENTS

| | | | | |
|---|---|---|---|---|
| 3,349,047 A | * | 10/1967 | Sheard ................. | 528/374 |
| 4,470,839 A | | 9/1984 | Gago .................... | 71/34 |
| 6,107,241 A | | 8/2000 | Ogata et al. .......... | 502/350 |
| 6,235,401 B1 | * | 5/2001 | Ogata et al. .......... | 428/472 |
| 6,429,169 B1 | | 8/2002 | Ichinose ............... | 502/350 |
| 6,818,697 B2 | * | 11/2004 | Zhang et al. ......... | 524/560 |
| 6,884,752 B2 | * | 4/2005 | Andrews .............. | 502/349 |
| 2003/0228413 A1 | * | 12/2003 | Ohta et al. ............ | 427/162 |
| 2004/0258723 A1 | * | 12/2004 | Singh et al. .......... | 424/401 |

FOREIGN PATENT DOCUMENTS

| | | | |
|---|---|---|---|
| JP | 07-171408 | * | 7/1995 |
| JP | 2002-212505 | | 7/2002 |
| JP | 2002-241522 | | 8/2002 |
| JP | 2002-348540 | | 12/2002 |

* cited by examiner

*Primary Examiner*—C. Melissa Koslow
*Assistant Examiner*—Patricia L. Hailey
(74) *Attorney, Agent, or Firm*—Perman & Green, LLP

(57) ABSTRACT

Method for producing novel photochemically-active metal oxide-containing aqueous compositions such as $TiO_2$ compositions coated or sprayed and dried under ambient conditions to form novel photochemically-active, colorless coatings having strong wetability and adhesion to clear substrates such as window glass. Preferably the present compositions include a suitable wetting agent or combination of agents to improve the wetability of the Titanium peroxide-containing amorphous film, allowing thinner films to be readily applied. Also the inclusion of an acrylic aliphatic urethane polymer can replace wholly or partially the titanium peroxide sol and provide additional film forming and wetability properties. The acrylic urethane polymer reduces or eliminates the amount of titanyl peroxide that is required and thereby reduces or eliminates the yellow color.

20 Claims, No Drawings

PHOTOCATALYTICALLY-ACTIVE, SELF-CLEANING AQUEOUS COATING COMPOSITIONS AND METHODS

CROSS-REFERENCE TO RELATED APPLICATION

This application is a divisional of, and claims priority to U.S. application Ser. No. 10/334,229, filed on Dec. 31, 2002 now U.S. Pat No. 6,884,752.

BACKGROUND OF THE INVENTION

1. Field of the Invention

The present invention relates to photocatalytically active (PCA) coating compositions containing a photocatalytically active oxide of a transition metal (MO) or ($MO_2$) such as titanium dioxide ($TiO_2$) or zirconium oxide ($ZrO_2$) catalyst for producing clear self-cleaning coatings, such as for glass windows, which react with and decompose organic compounds or pollutants, deposited thereon from the environment, under the effects of exposure to sunlight, particularly the ultraviolet radiation contained therein. The organic pollutants are decomposed to simple inorganic compounds such as $CO_2$, $H_2O$ and various mineral acids, which re-enter the atmosphere and/or wash away under the effects of heat, wind and/or rain, so that the coatings are self-cleaning with an efficiency which is dependent upon the degree of photocatalytic activity of the $MO_2$ catalyst, which is directly proportional to the total surface area of the $MO_2$ particles to which the pollutants are exposed.

2. State of The Art

It is well known that when a metal oxide, such as anatase $TiO_2$ powder, is illuminated by ultraviolet light with a wavelength below about 390 nm, electrons in the valence band are excited to the conduction band leaving behind positive-charged holes which are reactive with absorbed water vapor hydroxide ions, resulting in the formation of positive-charged hydroxyl radicals, $(OH)^+$. The hydroxyl radicals are strong oxidizing radicals which can react with and strip electrons from the organic pollutants to produce simpler, non-offensive products such as $CO_2$ and $H_2O$, or HCL if halogen pollutants are involved.

One commercially-available $TiO_2$ powder photocatalyst is Degussa P25, a 70:30% anatase/rutile mixture with a BET surface area of 55±15 $m^2g^{-1}$ and crystalline sizes of 0.1 nm in 30 nm aggregates. It forms an aqueous suspension in dilute alcohol which forms a chalky catalytic coating on glass. Reference is made to the article titled "Photocatalytic Degradation Of A Gaseous Organic Pollutant" by Yu et al., published in the Journal of Chemical Education, Vol. 25, No. 6, June 1998.

It is desirable to produce a $TiO_2$ composition which can be applied to surfaces such as window glass and dried under ambient conditions to form clear, self-cleaning photocatalytic coatings. Reference is made to articles by H. Ichinose et al. in the Journal Of The Ceramic Society Of Japan, titled "Synthesis Of Peroxo-Modified Anatase Sol From Peroxo-Titanic Acid Solution", Vol. 104, pages 914-917 (1996), and "Photocatalytic Activities Of Coating Films Prepared From Peroxotitanic Acid Solution-Derived Anatase Sols", Vol. 104, No. 8, pages 715-718 (1996). These articles describe a process to put small amounts (0.85% to 1.7%) of various forms or shapes (polymorphs) of titanium dioxide ($TiO_2$) into aqueous solution by reaction with hydrogen peroxide.

These solutions are called titanium peroxidases-TiO(OOH)

2. The amorphous titanium dioxide is the ingredient that results in the film-forming and adhesive characteristics of the product. The mixture is composed of equal weights of the amorphous and anatase (crystalline) forms of titanium dioxide, is soluble in water in up to about 2% by weight of the composition and can be applied at ambient conditions.

U.S. Pat. No. 6,107,241 (Ogata et al.) and U.S. Pat. No. 6,429,169 (H. Ichinose) disclose an anatase titanium oxide sol having a pH of 7.5 to 9.5 and a particle size of 8-20 nm which is a yellow suspension made by adding aqueous ammonia or sodium hydroxide to a titanium salt solution, such as titanium tetrachloride, washing and separating the formed titanium hydroxide, treating the formed titanium hydroxide with aqueous hydrogen peroxide solution, and heating the formed stable amorphous titanium peroxide sol having a concentration of about 2.9%, a pH of 6.0 to 7.0 and a particle size of 8 to 20 nm and a yellow transparent color to a temperature of 100° C. or higher to form an anatase titanium oxide sol. The anatase titanium oxide sol can thereafter be heated to 250° C. or higher to convert it to anatase titanium dioxide.

The amorphous titanium peroxide sol has good bonding strength but poor wetability for substrates and is not photocatalytic and is yellowish in color. The anatase titanium formed by heating the amorphous titanium peroxide sol to elevated temperatures is photocatalytic. Therefore mixtures of the amorphous titanium peroxide sol and the anatase titanium oxide sol are made to provide a mixed sol coating composition to which may be added more photocatalyst, such as titanium dioxide in sub-10 nanometer particle size powder form, and other inert additives such as inorganic and organic binder materials, which are clear and compatible with the peroxotitanic sol so as not to alter the pH or the clarity of the solution. Even small amounts of $TiO_2$ or other ingredients having particle sizes about about 10 nanometers will render the composition opaque and unsatisfactory for use as self-cleaning coatings on glass or other transparent substrates. The coating must be applied in the form of several layers or dips to provide adequate bonding but the end result is that the yellowish color of each layer is intensified to produce an unsatisfactory appearance on window glass. Multiple layers are necessary because the peroxide-forming film is very hydrophobic so that the coating composition does not have good wetting properties for glass and tends to bead on glass, leaving "holidays" or uncoated areas and requiring multiple overlayers.

A process of producing both an amorphous titanium peroxide solution in water and also anatase particles in the range of 6 to 10 nanometers is described in U.S. Pat. Nos. 6,107,241 and 6,429,169. The amorphous titanyl peroxide forms an insoluble film when the peroxide breaks down or reacts with water. This serves as a carrier for the anatase particles.

The application of the film independently, or with the particles embedded, when applied to glass, plastic or metal has the following problems.

1. The film former is very hydrophobic and does not wet out to form a continuous film. A heavy amount or thick layer of the composition is required to form a continuous film or covering. The surface tension or the peroxide-containing film is to some degree overcome by the added thickness and weight of the film. The time and labor for such application makes the use of the product impractical.

2. The film is formed with difficulty, and is yellowish in color due to the presence of the titanyl peroxide remaining and unreacted. This is aggravated if the weight and thickness of film is increased to overcome the surface tension of the titanyl peroxide solution to form a continuous coating on the substrate.

3. Transparency and clarity of the coating(s) when applied over glass is impaired due to the thickness required to overcome the non wettability of the substrate. The refractive index of the film so produced and the excessive thickness causes moiré patterns and a seemingly rainbow effect when viewed through clear glass.

The photo-chemically active component is the anatase polymorph. The peroxytitanic acid polymorph has no photochemical activity. The photo-chemically active polymorph is derived by heating the amorphous titanyl peroxide sol at 100 degrees centigrade temperature for six hours.

The peroxytitanic acid polymorph has a yellow coloration that remains in the product even when it is mixed with the titanium peroxidase. This yellow coloration is objectionable on clear window glass. However, the solubility of the $TiO_2$ is related to the addition of the peroxide; without the peroxide, the $TiO_2$ does not go into solution. Consequently, it is highly desirable, and necessary for many uses, to remove entirely, or to reduce as much as possible, the yellow coloration, to provide clear, self-cleaning window coatings.

SUMMARY OF THE INVENTION

The present invention relates to a novel method for producing novel photochemically-active metal oxide containing ($MO_2$) aqueous compositions which can be coated or sprayed and dried under ambient conditions to form novel photochemically-active, colorless coatings having strong wetability and adhesion to clear substrates such as window glass.

The metal oxide photocatalysts usable in the present invention include TiO sub.2, ZnO, SrTiO sub.3, CdS, CdO, CaP, InP, In sub.2 O sub.3, CaAs, BaTiO sub.3, K sub.2 NbO sub.3, Fe sub.2 O sub.3, Ta sub.2 O sub.5, WO sub.3, SaO sub.2, Bi sub.2 O sub.3, NiO, Cu. Sub.2 O, SiC, SiO sub.2, MoS sub.2, MoS sub.3, InPb, RuO sub.2, CeO sub.2 and the like. Of these, titanium oxide is preferred. Titanium oxide may be used in the form of particles or powder, or in the form of a sol.

The use of a suitable wetting agent or combination of agents alleviate the non wettability or hydrophobic nature of the Titanium peroxide-containing amorphous film, allowing thinner films to be readily applied. This reduces the moire patterns and the yellowing, as the thinner film has much less yellow nature, and also allows a faster cure and elimination of the yellow-causing peroxide over time. A suitable wetting agent is a polyethylene oxide silane in amounts of 1 to 10 percent of the dry weight of the film former (titanium peroxide sol). This material is commercially available as Dow Chemicals Silicone Q25211 super wetting agent (a polyethylene oxide silane).

The application of an acrylic urethane polymer solution as a primary coating over glass acts as a barrier to sodium and potassium ions migrating from the substrate up into the titanium layer and blocking photocatalysis.

An acrylic aliphatic urethane polymer can replace wholly or partially the titanium peroxide sol and provides additional film forming and wettability properties. The acrylic urethane polymer reduces or eliminates the amount of titanyl peroxide that is required and thereby reduces or eliminates the yellow color. The acrylic urethanes are the film forming counterparts of the titanyl peroxides that form insoluable films. Also due to the high oxidation resistance of the polymer, it resists self deterioration and is compatible with the titanium amorphous film former. Also, it reduces the moiré patterns by both reducing the refractive index of the coating as well as allowing a thin film to be applied. The chemical nature of the polymer is as follows:

An acrylic diol is capped with ethylene oxide. The molecular weight or hydroxyl number of the formed diol is between 110 and 150 mg KOH per gram solid diol polymer. At this point aliphatic diisocyanate is added in stoichiometric ratios of between 2 to 3 to one. The diisocyanate can be isophorone diisocyanate (IPDI Huls Chemical), or methylene bis cyclohexyl diisocyanate (Mondur W. Bayer Chemical). Other cyclo aliphatic diisocyantes can also be used. As the ratio of the diisocyanate increases, the polymer becomes harder and more chemically resistant. That fact and the use of the acrylic backbone insure a high degree of oxidation resistance and chemical resistance. Marine paints for instance are based on urethane acrylics.

The use of small amounts of dimethylol propionic acid and subsequent salt formation allow the urethane acrylic to go into water solution. Chain extension agents typically include ethylene glycol. The use of methylene, bis cyclohexyl diamine forms particularly hard and oxidation resistant films for this purpose when used as a carrier for the anatase particles.

The use of a peroxide mechanism of controlled degradation is not explicitly mentioned in prior art. Once the peroxide is formed of the $MO_2$ ($TiO_2$) metal oxide and the mineral is put in a sol state and if soluble in water the following process is available for nano production.

By heating at 100 degrees Celsius the peroxide begins to break down. The $MO_2$ units thus are allowed to combine in their natural crystalline states. As in the case of titanium dioxide, anatase particles are formed in the range of 6 to 10 nanometers. To achieve such a small range by grinding is not believed to be possible at this time. At below 40 nanometers the $TiO_2$ will reanneal or recombine due to the heat generated and the pressure of grinding. Also the distribution of particles, quantity versus numbers of particles present, contains 1 to ½% of very large agglomerations of particles. This prevents transparency in the case of $TiO_2$.

The following examples are illustrative of the preparation of compositions suitable for the application of colorless self-cleaning coatings to glass, metal and other substrates.

EXAMPLE 1

| Material | Dry weight | Wet weight |
| --- | --- | --- |
| Titanyl peroxide sol | 1.00 | 100 |
| Nano anatase particles | 1.00 | 100 |
| Polyethylene oxide silane | 0.10 | 10.0 |

EXAMPLE 2

| | | |
| --- | --- | --- |
| Titanyl peroxide sol | 1.00 | 100 |
| Nano anatase particles | 1.0 | 100 |
| Urethane acrylic copolymer | 1.0 | 2.857 |
| Polyethylene oxide silane | .20 | 2.0 |

EXAMPLE 3

| Nano anatase particles | 1.00 | 100 |
| Diisocyanate | 1.00 | 2.00 |
| (DMPA and IPDI adduct) | | |
| Polyethylene oxide silane | 0.10 | 10.0 |
| Tertiary amine catalyst | .10 | .10 |
| (polycat 41 air products) | | |

EXAMPLE 4

| Nano anatase particles | 2.00 | 200 |
| DMPA IPDI adduct | 1.0 | 2.0 |
| Polyethylene oxide silane | 0.10 | 10.0 |
| Urethane acrylic polymer | 1.0 | 2.857 |
| Polycat 41 | .10 | .10 |

EXAMPLE 5

| Nano anatase particles | 2.0 | 200 |
| DMPA IPDI adduct | 1.0 | 2.0 |
| Polyethylene oxide silane | .10 | 10.0 |
| Polycat 41 (tertiary amine) | .10 | .10 |

EXAMPLE 6

| Nano anatase particles | 1.0 | 100 |
| Titanyl peroxide sol | 0.5 | 50 |
| Polyethylene oxide silane | 0.10 | 10 |
| Urethane acrylic polymer | 0.5 | 1.4285 |

EXAMPLE 7

| Nano anatase particles | 1.0 | 100 |
| Titanyl peroxide sol | .5 | 50 |
| Polyethylene oxide silane | .10 | 10 |
| DMPA IPDI adduct | .5 | 1.0 |
| Polycat 41 | .10 | .10 |

The DMPI adduct is the reaction product of one mol of dimethyl propionic acid and two mols of isophorone diisocyanate. It is a water-soluble, stable cross-linking agent. The adduct is aliphatic and will not yellow. It is water soluble. The isocyanate is stable for a usable period of time in the water so that it can react in several ways. One would be the eventual reaction with water of the isocyanate to form an amine which would immediately react with isocyanate to form a film.

Polycat 41 is a tertiary amine catalyst which trimerizes the isocyanate to form a hard film which is compatible with the anatase sol particles to form an active photocatalytic film. Trimerization produces optically clear films which have a greater optical transmission of visible light than polyurethane polymers by themselves.

The present invention relates preferably to the use of all photochemically-active transition elements designated by $MO_2$, M being the transitional metal, and $O_2$ is the oxide thereof, most preferably $T_1O_2$ and $2rO_2$.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A substrate coated with an aqueous coating composition comprising a metal peroxide and from 1 percent to 10 percent of the dry weight of the metal peroxide of a water soluble polymeric wetting agent.

2. The coated substrate of claim 1 in which the substrate is selected from the group consisting of a glass, a metal, a polymer, a ceramic, concrete, masonry, wood, stone and a textile.

3. The coated substrate of claim 1 in which the substrate is selected from the group consisting of a glass, a metal and a polymer.

4. The coated substrate of claim 1 in which the substrate is clear or translucent.

5. The coated substrate of claim 1 in which the substrate is clear.

6. The coated substrate of claim 1 in which the substrate is opaque.

7. A substrate coated with an aqueous coating composition comprising a metal peroxide, photochemically-active metal oxide particles having a size within the range of about 6 to 10 nanometers and a water soluble polymeric agent where the quantity of the water-soluble polymeric agent present is in the range of from about 4.8 to about 9.1 percent by weight based on the total dry weight of the components of the composition.

8. The coated substrate of claim 7 in which the substrate is selected from the group consisting of a glass, a metal, a polymer, a ceramic, concrete, masonry, wood, stone and a textile.

9. The coated substrate of claim 7 in which the substrate is selected from the group consisting of a glass, a metal and a polymer.

10. The coated substrate of claim 7 in which the substrate is clear or translucent.

11. The coated substrate of claim 7 in which the substrate is clear.

12. The coated substrate of claim 7 in which the substrate is opaque.

13. The coated substrate of claim 7 where at least some of the metal oxide particles are dissolved in the composition.

14. The coated substrate of claim 7 where all of the metal oxide particles are dissolved in the composition.

15. The coated substrate of claim 7 where the metal peroxide is amorphous is one or more of its solid states.

16. The coated substrate of claim 7 where the metal peroxide is crystalline and photocatalytic is one or more of its solid states.

17. The coated substrate of claim 7 where the metal peroxide is a titanium peroxide sol.

18. The coated substrate of claim 7 in which the water-soluble polymeric agent comprises a polyethylene oxide silane wetting agent.

19. The coated substrate of claim 7 where the quantity of photochemically-active metal oxide particles is in the range of from about 31 to about 62 percent by weight based on the total dry weight of the components of the composition.

20. The coated substrate of claim 7 where the quantity of photochemically-active metal oxide particles is in the range of from about 45 to about 48 percent by weight based on the total dry weight of the components of the composition.

* * * * *